US012674552B2

(12) United States Patent
Van Roy et al.

(10) Patent No.: US 12,674,552 B2
(45) Date of Patent: Jul. 7, 2026

(54) METHOD FOR CONTROLLING A COMPRESSOR ROOM AND AN APPARATUS THEREOF

(71) Applicants: ATLAS COPCO AIRPOWER, NAAMLOZE VENNOOTSCHAP, Wilrijk (BE); KATHOLIEKE UNIVERSITEIT LEUVEN KULEUVEN R&D, Leuven (BE)

(72) Inventors: Wim Van Roy, Wilrijk (BE); Ebrahim Louarroudi, Wilrijk (BE); Philippe Geuens, Wilrijk (BE)

(73) Assignees: ATLAS COPCO AIRPOWER, NAAMLOZE VENNOOTSCHAP, Wilrijk (BE); KATHOLIEKE UNIVERSITEIT LEUVEN, Leuven (BE)

( * ) Notice: Subject to any disclaimer, the term of this patent is extended or adjusted under 35 U.S.C. 154(b) by 595 days.

(21) Appl. No.: 18/018,967

(22) PCT Filed: Sep. 2, 2021

(86) PCT No.: PCT/IB2021/058007
§ 371 (c)(1),
(2) Date: Jan. 31, 2023

(87) PCT Pub. No.: WO2022/064299
PCT Pub. Date: Mar. 31, 2022

(65) Prior Publication Data
US 2023/0313950 A1 Oct. 5, 2023

(30) Foreign Application Priority Data

Sep. 24, 2020 (EP) ..................................... 20198148

(51) Int. Cl.
F17D 3/01 (2006.01)
F17D 1/07 (2006.01)
G05B 13/04 (2006.01)

(52) U.S. Cl.
CPC ................. *F17D 3/01* (2013.01); *F17D 1/07* (2013.01); *G05B 13/04* (2013.01); *G05B 2219/2614* (2013.01)

(58) Field of Classification Search
None
See application file for complete search history.

(56) References Cited

U.S. PATENT DOCUMENTS 6,056,781 A * 5/2000 Wassick ............... G05B 13/048
                                                                 703/2
6,658,304 B1 * 12/2003 Molander ............ G05B 13/048
                                                                 700/67
(Continued)

FOREIGN PATENT DOCUMENTS

CN         101349893 A     1/2009
CN         105209983 A     12/2015
(Continued)

OTHER PUBLICATIONS

International Search Report and Written Opinion in corresponding PCT Application No. PCT/IB2021/058007, dated Nov. 22, 2021.
(Continued)

*Primary Examiner* — Jennifer L Norton
(74) *Attorney, Agent, or Firm* — BACON & THOMAS, PLLC

(57) ABSTRACT

A method for controlling a compressed air or gas system is disclosed including the steps of estimating a current state, predicting a future process variable profile based on the current state, sampling the future process variable profile by a sampling method having sampling frequencies based on a volume of the compressed air or gas system, transforming by
(Continued)

a model predictive control, MPC, method the sampled future process variable profile and the current state into an action profile and a state profile, and instructing the compressors to perform the actions in accordance with the action profile thereby controlling the compressed air or gas system.

14 Claims, 3 Drawing Sheets

(56) References Cited

U.S. PATENT DOCUMENTS

| | | | | |
|---|---|---|---|---|
| 11,656,612 | B2 * | 5/2023 | Espie | G05B 13/048 700/28 |
| 12,331,892 | B2 * | 6/2025 | Geuens | F15B 20/005 |
| 2003/0144766 | A1 | 7/2003 | Megan et al. | |
| 2005/0198981 | A1 * | 9/2005 | Arno | F25B 49/025 62/157 |
| 2007/0282487 | A1 * | 12/2007 | Kirchhof | F02C 9/28 700/287 |
| 2008/0131258 | A1 | 6/2008 | Liepold et al. | |
| 2009/0248174 | A1 | 10/2009 | Taha et al. | |
| 2009/0319059 | A1 * | 12/2009 | Renfro | G05B 17/02 700/30 |
| 2017/0002692 | A1 * | 1/2017 | Cheng | F01K 13/02 |
| 2017/0205809 | A1 * | 7/2017 | Sayyarrodsari | G05B 13/048 |
| 2018/0157247 | A1 * | 6/2018 | Hallihole | G05B 13/048 |
| 2018/0299075 | A1 * | 10/2018 | Esmaili | G05B 13/0265 |
| 2021/0026334 | A1 * | 1/2021 | Mazur | G05B 13/0265 |
| 2022/0283575 | A1 * | 9/2022 | Mehta | G05B 13/0265 |
| 2023/0178984 | A1 * | 6/2023 | Mehta | H02J 3/32 700/287 |
| 2024/0361754 | A1 * | 10/2024 | Van Roy | F04B 49/065 |
| 2026/0078749 | A1 * | 3/2026 | Esfeden | F04B 49/065 |

FOREIGN PATENT DOCUMENTS

| | | | | |
|---|---|---|---|---|
| CN | 209085657 | U | 7/2019 | |
| DE | 102016121338 | A1 | 5/2017 | |
| EP | 0384437 | B1 * | 7/1995 | G05B 13/024 |
| NO | 2008009073 | A1 | 1/2008 | |
| WO | 2008009072 | A1 | 1/2008 | |
| WO | WO-2024141848 | A1 * | 7/2024 | F04C 23/001 |

OTHER PUBLICATIONS

EP Search Report in corresponding EP Application No. 20198148, dated Mar. 8, 2021.

\* cited by examiner

METHOD FOR CONTROLLING A COMPRESSOR ROOM AND AN APPARATUS THEREOF

FIELD OF THE INVENTION

The present invention relates to the field of compressors and more in particular to controlling a compressor system for providing compressed air or gases to consumers.

BACKGROUND OF THE INVENTION

It is known that compressors are used to compress air or gases in one or more compression stages. The compressed air or gas it then provided to one or more consumers. The distribution thereof is provided through a compressed air or gas system.

Since the number of consumers may be vast and spatially distributed over a significant area, for example in an industrial plant or in a hospital, usually a central hub is installed for providing therefrom the compressed air or gases.

A central hub normally comprises one or more compressor rooms wherein in each room one or more compressors are installed. Further, auxiliary devices such as valves, filters, dryers, vessels, sensors, controlling components, and/or other devices for managing and/or controlling the compressor rooms are likewise installed. Next, from the one or more compressor rooms onward pipes or ducts depart for supplying the consumers. As a last part in the chain, the compressed air or gas is utilized by the consumers for a variety of applications.

Furthermore, between the compressors and the consumers another set of devices may be present as well such as safety valves, distribution valves, control sensors, or other devices for controlling and safeguarding the distribution of the compressed air or gases.

The described set-up will further be nominated as a compressed air or gas system. Hence, a compressed air or gas system may comprise one compressor supplying one consumer but will generally be regarded as more extensive thus comprising a multitude of components, thereby constituting a complex system of several elements interacting with each other.

To make use of the compressed air or gas system, the different parts thereof need to be controlled. It is already known to separately control compressors by means of independent local controllers, whereby the different controllers are set at a predefined pressure value thereby switching the compressors sequentially on or off, depending on the consumption of compressed air.

It is further known to apply a method for controlling a compressed air or gas system by a number of communicating controllers for controlling components that are part of the compressed air or gas system, whereby the components are controlled such that none of the controllers determines the operational condition of any component that is controlled by other controllers. In WO2008/009073 such a method is disclosed.

In WO2008/009072 another method is disclosed for controlling a compressed air unit which consists of several compressed air or gas networks having at least one commonly controllable component, whereby, on the basis of measurement data of at least one of the compressed air or gas networks, at least the common component is controlled by at least one controller.

However, a disadvantage of these controlling methods is that they solely operate based on the current state of the compressed air or gas system, meaning that they are incapable of considering a prediction of any kind. This leads to suboptimal control and higher energy cost.

SUMMARY OF THE INVENTION

The present invention aims to remedy the above-mentioned and other disadvantages. To this end, the present invention concerns a method for controlling a compressed air or gas system comprising one or more compressors configured to provide compressed air or gas to one or more consumers, the compressed air or gas defined by one or more process variables, the method comprising the steps of:

- estimating a current state of the compressed air or gas system based on observed data;
- predicting a future process variable profile based on the current state;
- sampling the future process variable profile by a sampling method having a sampling frequency based on a volume of the compressed air or gas system, thereby obtaining a sampled future process variable profile;
- transforming by a model predictive control, MPC, method the sampled future process variable profile and the current state into:
  - an action profile comprising one or more actions distributed over a predefined first time-horizon; and
  - a state profile distributed over a predefined second time-horizon being equal or greater than the predefined first time-horizon; and
- instructing the one or more compressors to perform the one or more actions in accordance with the action profile thereby controlling the compressed air or gas system.

The compressed air or gas system comprises one or more compressors as mentioned above. Optionally, the compressed air or gas system may further comprise one or more agents, such as a blower, a fan, a nitrogen generator, a piston, a turbo, a variable frequency drive agent, a dryer, a valve, a lubricator, a filter, a pressure regulator, a flow switch, or any other device or component suitable for a compressed air or gas system.

The compressed air or gas is defined by one or more process variables, like a flow, a pressure, a pressure dew point, a gas temperature, an oxygen level, an enthalpy level, a relative humidity, a partial gas pressure, a dissolved oxygen level, an oil contamination level, or any other parameter suitable for the compressed air or gas.

In a first step, a current state of the compressed air or gas system is estimated. The state is indicative for a status of a part of an agent and/or compressor. The estimation is based on observed data. This data originates from sensors configured to measure or observe one or more process variables. The estimation of the current state is then performed based on a direct measured signal, and/or on processing the measured or observed signals or data.

Optionally, the estimating may be further based on a model of the compressed air or gas system when present. The model is, for example, a set of equations, an algorithm, a black-box approach or any other suitable way of modelling the compressed air or gas system.

The current state is indicative for the status of the compressed system and may be expressed by one or more process and/or working variables and is thus indicative for the present condition of the compressed air or gas system. The current state may be a scalar, i.e. presented by one discrete or continuous value, but will commonly comprise a string of variables each expressing the state. In the latter, the current state is thus represented as a vector, a matrix, an array, or any other suitable representation.

Next, in a second step, a future process variable profile is predicted based on the current state. The future process variable profile comprises a series of predicted future process variables over a finite time-horizon. Furthermore, for each of the process variables estimated in the first step, such a profile may be predicted. Optionally and preferably, the prediction may further be based on historical data of measurements performed on the compressed air or gas system. The predicted series may constitute a continuous graph or a discrete range of scalars. The historical data may then be updated by the current state and/or observed data.

The predicted future process variable profile expresses an expected profile of the set of process variables in the future. The time range thereof may vary from a couple of minutes, several hours, or even several days. It should be further understood that the size of this range depends on, for example, the complexity of the compressed air or gas system or the capacity of processing units controlling and managing the compressed air or gas system.

In a third step, after the prediction is made, the future process variable profile is sampled by a sampling method having a sampling frequency based on a volume of the compressed air or gas system, which is either known in advance or estimated. The volume is, for example, the volume of the vessel and/or of the whole compressed air system, like the gas volume. Preferably, the sampling method comprises two or more sampling frequencies. When, for example, the future process variable profile comprises a flow demand, the profile will be sampled by a short sampling interval when the flow changes fast and sampled by a longer sampling interval when the flow changes slowly. Differently formulated, the sampling frequency will be high when the flow changes rapidly and low when the flow changes smoothly. The sampled future process variable profile will thus have several non-equidistant samples.

Next, the sampled future process variable profile and the current state are transformed into two other profiles by a model predictive control (MPC) method.

The first profile generated by the MPC method is an action profile. The action profile is a profile extending over a first time-horizon comprising a consecutive range of actions. These actions express acts or operations which may be performed for controlling the compressed air or gas system. An action is, for example, switching a compressor on or off, opening, partially opening, or closing a valve, redirecting or adjustment of a compressor flow, or any other actions triggerable by the compressors and/or agents for controlling the system. In other words, by an action the state may be changed or manipulated into a desired new state, or, the state may be maintained whereby an action is then to be regarded as a reaction against internal or external effects or impacts.

The action profile is distributed over a predefined first time-horizon, whereby the size thereof likewise depends on the complexity of the compressed air or gas system, on the processing capacity of controlling units, but also on the reaction that a particular action has or will have.

The second profile generated by the MPC method by transforming the sampled future process variable profile and the current state is a state profile distributed over a predefined second time horizon. The size of this second time-horizon is equal or greater than the predefined first time-horizon of the action profile.

Finally, the method comprises the step of instructing the one or more compressor to perform the actions in accordance with the action profile.

By adaptively sampling the future process variable profile at one or two distinct sampling frequencies, the profile is made suitable for processing it with a processing system. Moreover, when two or more sampling frequencies are used, the samples have a non-equidistant sampling grid are more efficient in terms of real-time performance and memory usage. Furthermore, and advantageously, by using different sampling frequencies based on the gas volume, the properties of the compressed air or gas system are considered upfront.

It is further an advantage that an action as well as a state profile are generated simultaneously such that a mutual interaction is considered upfront. Furthermore, instead of only relying on prediction or on only a current state, the interaction and correlation between actions and states are considered and tackled in an optimal manner.

Another advantage is that switching and idle cost are considered such that significant energy savings can be achieved while still decreasing the wear on machines within the compressed air or gas system. This is because the predicting allows to optimally schedule the most suitable compressors in advance, while simultaneously minimizing the idling time. Additionally, the quality of delivered compressed air or gas can be improved, for instance, by preheating compressors so that dryers will be running more efficiently and the concentration of moist is drastically reduced.

According to an embodiment, the method further comprises the steps of:

comparing the sampled future process variable profile with a previous state profile to identify one or more zones of the sampled future process variable being within a predefined deviation threshold;

and wherein the predicting is further based on the one or more zones.

The zones being within the predefined deviation threshold are in line with the previous state. Differently formulated, these zones comprise predictions which are assumed to be correct or accurate. Therefore, for these zones the computed or calculated data can be reused. Thus, by basing the predicting step on these zones, no predictions must be made, but the previous data may be reused. Additionally, a small overlap region at both sides of the zones may considered as well. By considering the zones when prediction, the prediction step will be performed more efficiently.

Additionally, the sampling frequency is further based on one or more of the group of:

an uncertainty factor of the predicting;

one or more working parameters of the compressed air or gas system;

response time compressor.

By taking the uncertainty of the prediction into account less accurate predictions will lead to a lower sampling frequency. This way, the predicting is optimized.

Further, besides the volume of the compressed air or gas system, other working parameters or machine properties may be considered, such as a reaction time of the compressors, the agents, dryers and/or expanders.

According to a second aspect, the invention relates to a data processing system comprising means for carrying out the method according to the first aspect.

According to a third aspect, the invention relates to a computer program comprising instructions which, when the program is executed by a computer, cause the computer to carry out the method according to the first aspect. Optionally, the program may be executed by a second computer, whereby the second computer causes to receive encoded data from the first computer and decodes the received data by performing one or more of the steps of the method according to the first aspect.

In other words, the steps may be divided among different computers, whereby one of these computers may be located at a different location compared to the other ones.

According to a fourth aspect, the invention relates to a computer-readable data carrier having stored thereon the computer program of the third aspect.

BRIEF DESCRIPTION OF THE DRAWINGS

The invention will further be illustrated with references to the drawings, wherein.

DETAILED DESCRIPTION OF THE INVENTION

Figure 1:
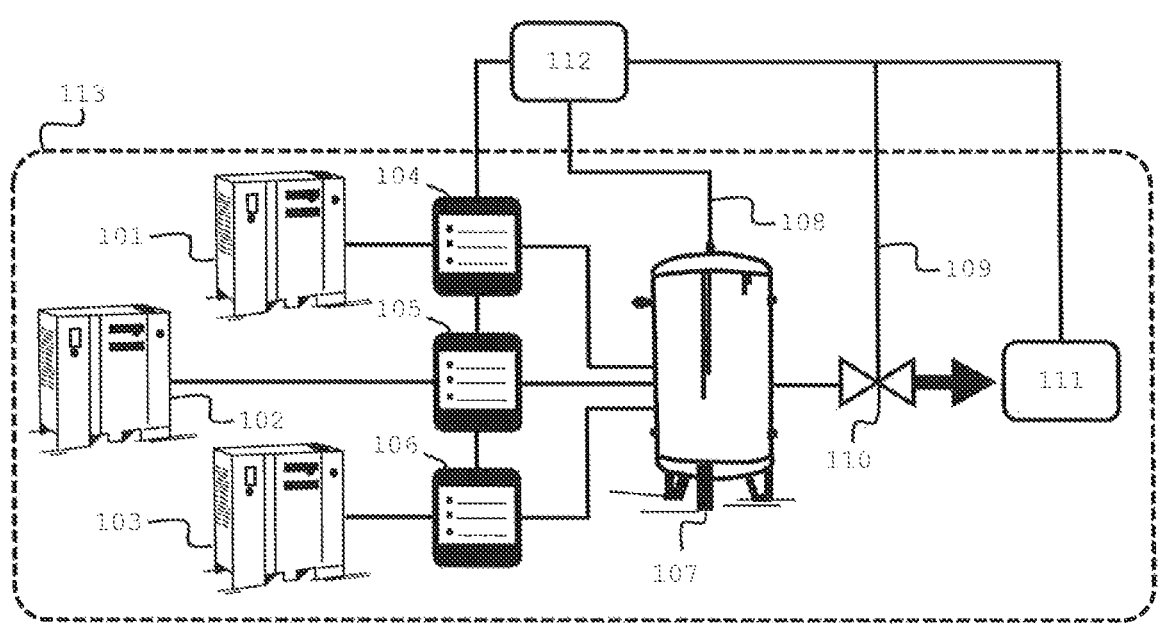
FIG. 1 illustrates a compressed air or gas system.

FIG. 1 illustrates a compressed air or gas system 113 comprising three compressors 101-103 configured to provide compressed air or gas to a client network 111. The compressed air or gas system 113 further comprises a vessel or tank 107 for storing compressed air or gas and a valve 110 connected to the client network 111. At the client's network 111 one or more consumers are present.

It should be further understood that the compressed air or gas system 113 may further comprise other devices such as dryers, filters, regulators, and/or lubricators, but in the continuation of this text, the invention will be illustrated with reference to FIG. 1 as a set-up of the compressed air or gas system 113.

The compressors 101-103 are each locally controllable by a respective controller 104-106. Further, to efficiently control the compressed air or gas system 113, the controller 104-106 will be controlled in a coordinated manner. In other words, it is avoided that the controllers 104-106 each individually control their respective compressor 101-103. Yet, the controllers 104-106 are instructed by a master controller 112 such that the overall performance and efficiency of the compressed air or gas system 113 is increased.

The controller 112 may be located near the controllers 104-106 but may also be located on a remote place compared to the compressed air or gas system 113. Alternatively, one of the controllers 104-106 can be configured to act as the master controller for controlling all the compressors 101-103.

Through the master controller 112 the running, switching and idle costs of the compressed air or gas system 113 are tackled thereby reducing wear of components of the different devices while at the same time the energy consumption thereof 113 is optimized. To this end, both the current demand of the client network 111 as well as a future demand are considered.

Figure 2:
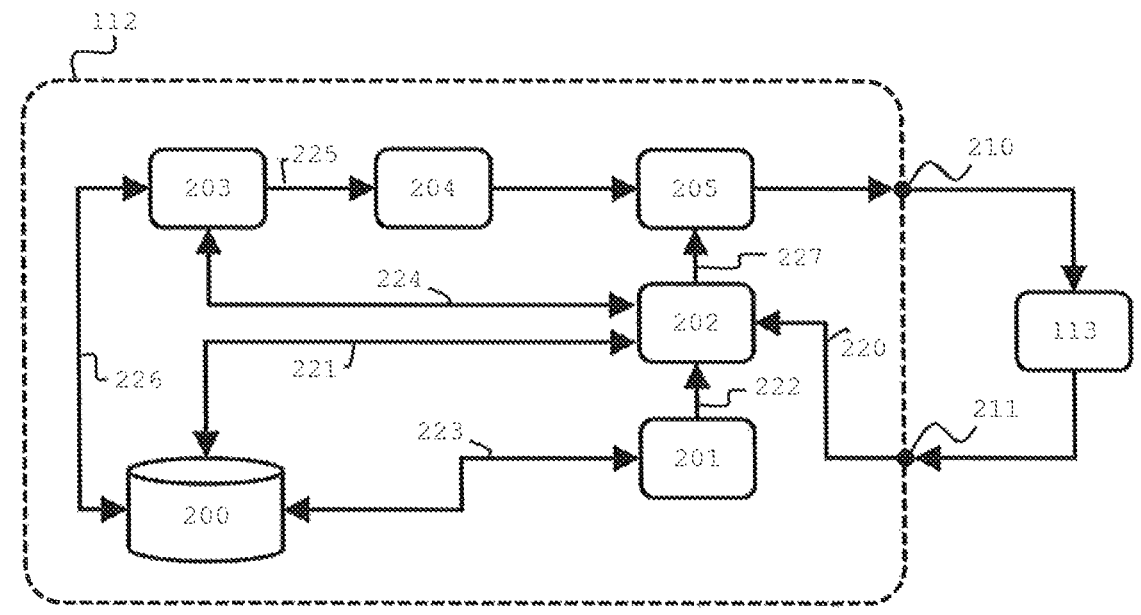
FIG. 2 illustrates a flow diagram of the method for controlling a compresses air or gas system.

The method through which the master controller 112 controls the compressed air or gas 113 is illustrated in FIG. 2 by a flow diagram. The master controller 112 controls and communicates with the compressed air or gas system 113 through an output 210 and an input 211.

With again reference to FIG. 2, the different modules or building elements of the master controller 112 are a database 200, a set of compressor models and/or a model of the compressed air or gas system 201, one or more estimators 202, a flow prediction block 203, a sampling block 204, and a model predictive control (MPC) block 205. Note that although these blocks 200-205 are illustrated as being part of one master controller 112, it should be noted that they may physically or even virtually be distributed with respect to each other. For example, the database 200 may be located on a remote server and accessible via a custom-made data connection.

Figure 3:
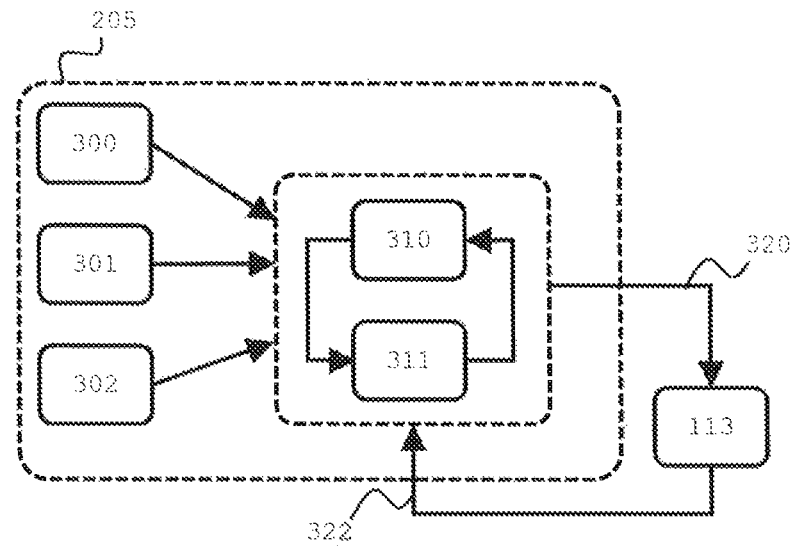
FIG. 3 illustrates a schematic diagram of a model predictive control method.

Before further explaining the building blocks 200-205 of the master controller 112 into detail, the requirements of a generic MPC method will be illustrated with reference to FIG. 3. FIG. 3 illustrates such a method suitable for using it for controlling a compressed air or gas system 113.

To control a compressed air or gas system 113, one or more objectives 300 must be defined, one or more constraints 301 must be considered, and predictions 302 are made. The objectives 300 are, for example, a constant pressure or a constant flow in the client network 111. The constraints are, for example, a maximum pressure or a volume of the vessel 107.

Next, through a solver 310 and through simulation models 311 actions 320 are defined 320 as instructions for the compressed air or gas system 113. Finally, to verify if the compressed air or gas network 113 performs as wanted, measurements 322 are send back to the solver 310 and simulation models 311 to determine if the actions 320 needs to be adapted.

It should be further understood that the illustration in FIG. 3 of the MPC block 205 differs from that in FIG. 2 in that the feedback by measurements 322 versus 211 is related to the inventive concept of the invention. This is, instead of directly feedback 322 any measurements from the compressed air or gas system 113, the feedback 211 is processed by the computer-implemented method in an inventive manner as already discussed above and further highlighted with references to the figures below.

The functioning of the method will further be discussed from a point of view that the compressed air or gas system 113 is operational in the sense that any transitional phenomena from, for example, a start-up or shut down, are not present. In other words, although the steps are discussed in a numbered manner, there is no hierarchy between them nor have these steps to be followed in a strict order. This means, the blocks 200-205 each separately are configured to perform a dedicated task by considering an input and process it into an output. Hence, every building block 200-205 has its own specific function and eliminates the shortcomings of the existing methods in the state of the art.

In a first step, the one or more estimators 202 receive 220 measurements 211 of the compressed air or gas system 113. The one or more estimators 202 may further consult 221 the database 200 and may use 222 an existing set of compressor models 201 as a further input. Note that the set of compressor models 201 may also be incorporated 223 into the database 200 itself.

The set of compressor models 201 are representative for the compressed air or gas system 113. A model may be a digital twin of a compressed air or gas system, it may be a model comprising a set of differential equations representative of a compressed air or gas system, or it may even be a black box approach.

The estimator block 202 will estimate a current state of the compressed air or gas system 113 based on received 220 measurements 211, and optionally based on the models 201. Additionally, former estimations may be uploaded 221 from the database 200 to increase the accuracy of the estimation.

Next, the output of the estimation block 202 is used as an input 224, 227 for the flow prediction block 203 respectively the MPC block 205. Furthermore, the output 221 may be used to update the database 200.

In a subsequent step, the prediction block 203 predicts one or more future process variables of the compressed air or gas system 113. The prediction 225 is based on the output 224 of the estimator block 202 and optionally 226 on data stored in the database 200.

The prediction block 203 uses current process variables and agent state data of the compressed air or gas system 113 to calculate a desired state of the compressed air or gas system 113 for an appropriate time horizon. These variables or data are, for example, a vessel pressure and a flow demand and is expressed in a future process variable profile.

It should be further understood that prediction is concerned with estimating outcomes for unseen data, while forecasting is a sub-discipline of prediction in which predictions are made about a future using time-series data. A difference between prediction and forecasting is thus that in the latter a temporal dimension is considered. In this way, the term prediction may also be interpreted as forecasting, yet in the continuation of this description, the term prediction will be used.

The prediction block 203 considers past process variable data, through 226 the database 200, and current process variable data, through 224 the estimator block 202. Additionally, other input data like past and future state agent data, production planning, calendar data, holiday data, and/or weather forecasting data can be considered.

The output 225 of the prediction block 203 comprises a data profile of a predicted process variable given for a predefined time horizon which may be set by a user, or by an MPC program which will be further discussed. In the latter, the setting of the time horizon is automated.

The prediction block 203 is a predictor function block based on an input-output model with inputs, outputs, model parameters and hyper parameters. As exemplary illustrations, four prediction paradigms are discussed which are suitable for the prediction block 203.

A multiple output prediction strategy that directly estimates or trains the predictor function for a given fixed time horizon H using any function approximator. This approach is further known as a multi-step approach.

Herein, the multi-variate predictor function is directly trained given current and past observations.

A recursive multi-step prediction method wherein a suitable (I)/O model is chosen. From trained parameters of the (I)/O model, the predictor function is constructed, and the output is simulated or forecasted recursively for a given time horizon H.

A direct multi-step prediction strategy which comprises a construction for each forecast time step a separate predictor.

As a fourth prediction paradigm, a hybrid prediction strategy may be used combining two or more of the above-mentioned paradigms.

Next, in a sampling block 204, the output 225 is sampled at a sampling frequency suitable for the MPC block 205. If needed, the sampling frequency may be reset or may be varying in time.

Figure 4:
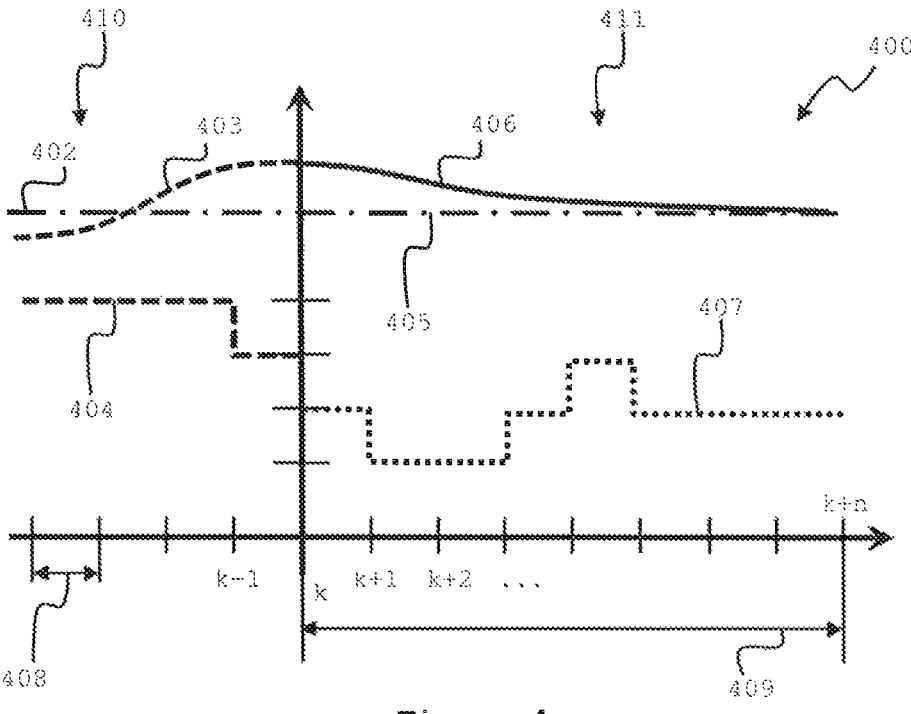
FIG. 4 illustrates a schematic model predictive control method solution.

FIG. 4 further illustrates the operation of the MPC method solution. This solution will calculate the most optimal action for the compressors 101-103 in order to follow a setpoint 405 as close as possible.

In order to do this, it requires the setpoint 405, past data 410, models and a predicted demand. The past data 410 comprises past setpoints 402 and their actual values 403, as well as the actions 404 taken by the compressors 101-103 through their respective controllers 104-106.

The models used in the solver comprise at least a model for each compressor in control and a model for the compressed air or gas system.

For the future estimation 411, a sampling method will pre-determine the time between each calculation node 408. By allowing a non-equidistant grid, the calculation speed can be improved based on the situation. In estimation zones where a lot of actions need to be taken, a finely grounded grid can be selected. These are the zones where large changes in the estimation are present or which are in the very close future. A slow changing estimation zone can be sampled very roughly as also the commands to the compressors will not change that often.

Based on this data, a future estimation will be generated 411 by the MPC procedure. In the process of solving for this action set, a prediction for the parameter under control 406 will be generated as well as a limited subset of states from the system such as the state of the compressors 101-103, the generated flow and pressures for the complete horizon 409 at each timestep k until k+n. Based on this data, an action set 407 for all compressors 101-103 will be extracted.

After solving the problem, from the action set (407 the first timestep or timesteps will be used for control. In the next cycle, the obtained solution will be used and updated in order to reduce the calculation time.

The given MPC problem should be solved in such a way that it always has a feasible solution within the loop time. The procedure will thus be stopped either when the optimal solution is found or when the maximum calculation time is elapsed. It will first solve for feasibility and only afterwards to optimality. In this way, it can always guaranty a feasible solution.

A feasible but suboptimal solution can alternatively be generated as well by an already implemented or in literature described solution such as a sequencer, lookup-table or a previous feasible solution, for example by consulting the database 200.

A vast improvement can be made compared to the state of the art by handling the states of the machines in a special manner. These compressor states such as loaded, unloaded or stopped lead to discrete variables which are normally solved using one of several existing techniques such as a custom heuristic, branch & bound, a linear program simplex solver or dynamic programming. These calculations are normally performed for every new solution. However, when the solutions can be reused, a large reduction in calculation requirements can be made leading to lower hardware requirements. Reusing of previous solutions is based on the existence of a validity range as explained later.

As a final step of the MPC solve procedure, the continuous variables will be refined using a Newton-Lagrange method-based solver or a custom heuristic created for this specific purpose.

Figure 5:
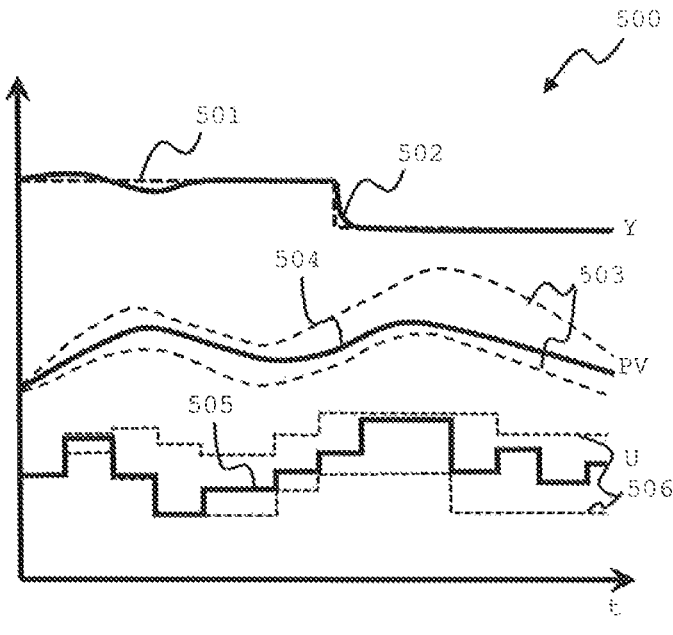
FIG. 5 illustrates a prediction in action at a first-time step.
Figure 6:
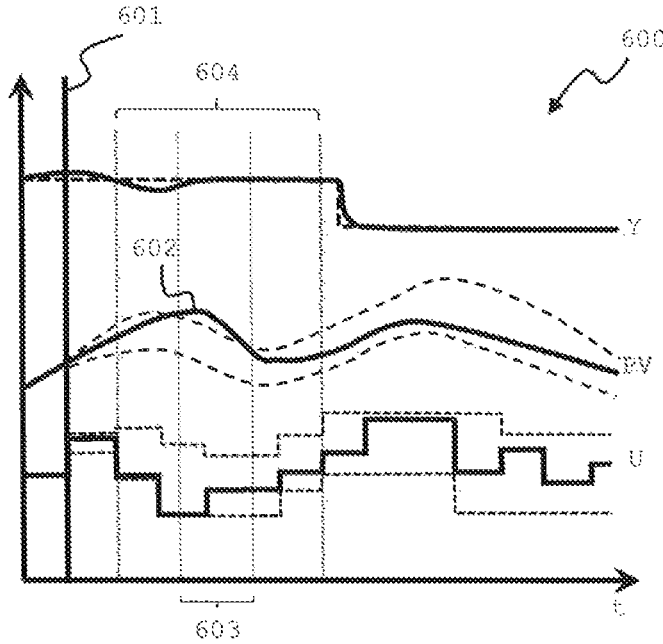
FIG. 6 illustrates a prediction in action at a second-time step.

FIGS. 5 and 6 further explain the methodology used to reuse previous solutions by using a validity range 503. This range 503 will be calculated during the solution phase of the discrete variables in the MPC method. In the zones where a new prediction falls within this validity range, a new solution should not be recalculated.

Furthermore, during the calculation step of the MPC methodology, other useful data can be extracted in order to validate the behavior of the system. This data can be used afterwards to analyze the system for possible issues such as a too small airnet volume or compressor sizing.

FIG. 5 illustrates the data generated by a calculation step from the model predictive method solution. It compromises of the setpoint 501 with the predicted trajectory Y 502, a prediction PV 504 with its validity range 503 and the continuous control actions U 505 with their validity range 503.

As mentioned before, each iteration in the control loop, the previous solution will be shifted to a new starting point 601 as seen in FIG. 6. Afterwards, a new prediction PV will arrive and be compared to the validity range of the previous solution. As long as this prediction is within its validity range, only a small update on the continuous variables is required. However, when the prediction is outside of the validity range 602, a larger update is required involving the discrete variables. Therefore, the zone where the violation occurs 603 and a neighborhood 604 will be marked for update of the discrete variables.

It can also happen that during the calculation, the continuous variables violate their validity range. Also, in this case, a larger update might also be required and the zone with their neighborhood will be marked for update.

These validity bounds can be calculated in two ways. Either based on the feasibility of obtaining the values while maintaining the discrete variables or based on optimality. The bounds generated by the optimality condition are smaller than when generated using the feasibility bounds. They however guaranty that when the new prediction PV and their calculated controls U are within these bounds, optimality is guaranteed.

It can be foreseen to have both bounds available in the algorithm. In this case, the validity-based bounds need to be solved within one control cycle of the model predictive control algorithm as well as making the complete problem feasible. Optimality-based bounds can be postponed until they either expire or when there is sufficient time to solve them.

The invention claimed is:

1. A computer-implemented method for controlling a compressed air or gas system comprising one or more compressors configured to provide compressed air or gas to one or more consumers, the compressed air or gas defined by one or more process variables, the method comprising a plurality of steps of:

measuring at least one of said one or more process variables and inputting the measurement to a master controller, wherein the master controller:

estimates a current state of the compressed air or gas system based on said one or more measured process variables;

predicts a future process variable profile based on the current state;

samples the future process variable profile by a sampling method having a sampling frequency based on a volume of the compressed air or gas system, thereby obtaining a sampled future process variable profile;

transforms, by a model predictive control (MPC) method, the sampled future process variable profile and the current state into:

an action profile comprising one or more actions distributed over a predefined first time-horizon; and a state profile distributed over a predefined second time-horizon being equal or greater than the predefined first time-horizon; and outputting instructions to said compressed air or gas system to perform the one or more actions in accordance with the action profile; and causing the compressed air or gas system to perform the one or more actions to adjust said one or more measured process variables to control a flow of said compressed air or gas from the compressed air or gas system to a client network.

2. The computer-implemented method according to claim 1, wherein the compressed air or gas system further comprises one or more agents; and wherein the instructing further comprises instructing the one or more agents to perform the one or more actions in accordance with the action profile.

3. The computer-implemented method according to claim 1, further comprising a step of:

comparing the sampled future process variable profile with a previous state profile to identify one or more zones of the sampled future process variable being within a predefined deviation threshold;

and wherein the predicting is further based on the one or more zones.

4. The computer-implemented method according to claim 1, wherein the sampling frequency is further based on one or more of a group of:

an uncertainty factor of the predicting;

one or more working parameters of the compressed air or gas system;

response time compressor.

5. The computer-implemented method according to claim 1, wherein the estimating of the current state is further based on a model of the compressed air or gas system.

6. The computer-implemented method according to claim 1, wherein the predicting is further based on historical data.

7. The computer-implemented method according to claim 6, further comprising the step of:

updating the historical data by the current state and/or observed data.

8. The computer-implemented method according to claim 1, wherein said at least one of said one or more measured process variables comprises one of a group of a pressure, a pressure dew point, a gas temperature, an oxygen level, an energy level, a relative humidity, a partial gas pressure, a dissolved oxygen level, and/or an oil contamination level.

9. The computer-implemented method according to claim 2, wherein an agent comprises one of a group of a blower, a fan, a piston, a turbo, a variable frequency drive agent, a dryer, a valve, a lubricator, a filter, a pressure regulator, and/or a flow switch.

10. A data processing system comprising a means for carrying out the method according to claim 1.

11. A non-transitory computer-readable medium comprising instructions which, when the instructions are executed by a computer, cause the computer to carry out the method according to claim 1.

12. A non-transitory computer-readable medium comprising instructions which, when the instructions are executed by a second computer, cause the second computer to receive encoded data from a first computer and decode the received encoded data by performing one or more of the plurality of steps of the method according to claim 1.

13. A compressor or an agent comprising the data processing system according to claim 10.

14. A compressed air or gas system that is controlled according to the method according to claim 1.

*   *   *   *   *